(12) United States Patent
Chami et al.

(10) Patent No.: US 9,537,153 B2
(45) Date of Patent: Jan. 3, 2017

(54) CURRENT COLLECTOR FOR A LITHIUM BATTERY

(71) Applicant: COMMISSARIAT A L'ENERGIE ATOMIQUE ET AUX ENERGIES ALTERNATIVES, Paris (FR)

(72) Inventors: Marianne Chami, Fontaine (FR); Severine Jouanneau-si Larbi, Sillans (FR)

(73) Assignee: Commissariat a l'Energie Atomique et aux Energies Alternatives (FR)

( * ) Notice: Subject to any disclaimer, the term of this patent is extended or adjusted under 35 U.S.C. 154(b) by 94 days.

(21) Appl. No.: 14/410,504

(22) PCT Filed: Jun. 25, 2013

(86) PCT No.: PCT/FR2013/051479
§ 371 (c)(1),
(2) Date: Dec. 22, 2014

(87) PCT Pub. No.: WO2014/009624
PCT Pub. Date: Jan. 16, 2014

(65) Prior Publication Data
US 2015/0340699 A1 Nov. 26, 2015

(30) Foreign Application Priority Data
Jul. 9, 2012 (FR) .................................. 12 56610

(51) Int. Cl.
*H01M 4/66* (2006.01)
*H01M 4/04* (2006.01)
(Continued)

(52) U.S. Cl.
CPC ........... *H01M 4/667* (2013.01); *H01M 4/0404* (2013.01); *H01M 4/0414* (2013.01); *H01M 4/668* (2013.01); *H01M 10/052* (2013.01); *H01M 4/386* (2013.01); *H01M 4/505* (2013.01); *H01M 4/525* (2013.01); *H01M 4/5825* (2013.01);
(Continued)

(58) Field of Classification Search
CPC .... H01M 4/667; H01M 4/668; H01M 4/0404; H01M 4/0414
See application file for complete search history.

(56) References Cited

U.S. PATENT DOCUMENTS

2002/0106561 A1* 8/2002 Lee .................. H01M 4/602
429/218.1
2009/0130549 A1 5/2009 Kelley et al.
(Continued)

FOREIGN PATENT DOCUMENTS

WO 2006105186 A2 10/2006
WO 2006105187 A1 10/2006

OTHER PUBLICATIONS

International Search Report Application No. PCT/FR2013/051479 Completed: Oct. 9, 2013, Mailing Date: Oct. 17, 2013 3 pages.
(Continued)

*Primary Examiner* — Stewart Fraser
(74) *Attorney, Agent, or Firm* — St. Onge Steward Johnston & Reens, LLC (57) ABSTRACT

This current collector for a lithium electrochemical accumulator includes an electronically-insulating viscoelastic foam associated with an electroconductive polymer film.

15 Claims, 5 Drawing Sheets

(51) Int. Cl.

| | |
|---|---|
| *H01M 10/052* | (2010.01) |
| *H01M 4/38* | (2006.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC ......... *H01M 10/0525* (2013.01); *Y02E 60/122* (2013.01); *Y10T 156/10* (2015.01)

(56) References Cited

U.S. PATENT DOCUMENTS

2011/0059362 A1* 3/2011 West .................. H01M 4/0404
429/219
2011/0262813 A1 10/2011 Jung

OTHER PUBLICATIONS

Sanchez-Coronado, et al.; "Thermomechanical Behavior of a Graphite Foam"; Carbon 41, (2003) 1175-1180.

* cited by examiner

CURRENT COLLECTOR FOR A LITHIUM BATTERY

FIELD OF THE INVENTION

The invention relates to a current collector for an electrochemical lithium battery or accumulator. Such a current collector comprising a viscoelastic foam also ensures the accumulator packaging function.

BACKGROUND OF THE INVENTION

Electrochemical lithium accumulators operate based on the principle of lithium insertion or deinsertion (or intercalation-deintercalation) on at least one electrode.

They comprise an electrochemical anode/electrolyte/cathode core which may be integrated in a structure having a cylindrical, prismatic, or stacked geometry, for example. The two electrodes each comprise a current collector and are separated by a separator which can appear in solid or polymeric form (membrane).

Generally, the accumulator core is protected from external elements by a rigid or flexible package.

Figure 1A:
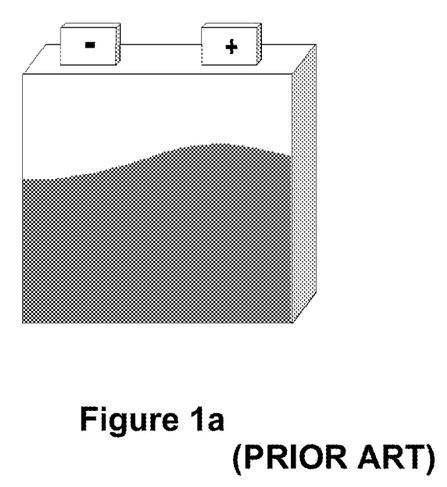
FIGS. 1a and 1b illustrate a Li-ion cell in a rigid package according to prior art.
Figure 1B:
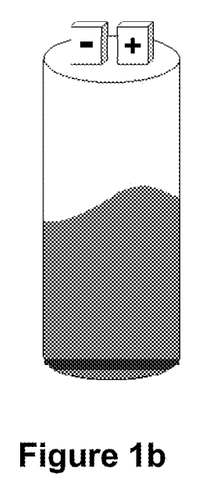

The accumulator may thus be contained in a metal package (FIG. 1), for example, made of aluminum. This type of package is generally designed to comply with different types of constraints: electrical (relative to the flowing of the electric current); mechanical; thermal; or safety (safety vents on the package). Generally, the package is sealed by welding, for example, by means of a laser, which gives it tightness properties along time. Further, the accumulator operation is ensured by the presence of connections external to the package.

Although the use of a metal package provides many advantages, its weight non-negligibly affects the energy density of the accumulator.

Figure 2:
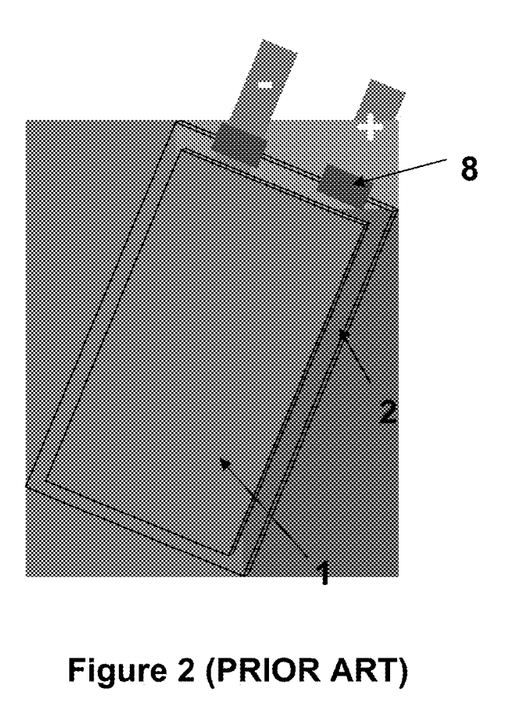
FIG. 2 illustrates a Li-ion cell in a flexible package according to prior art.
Figure 3:
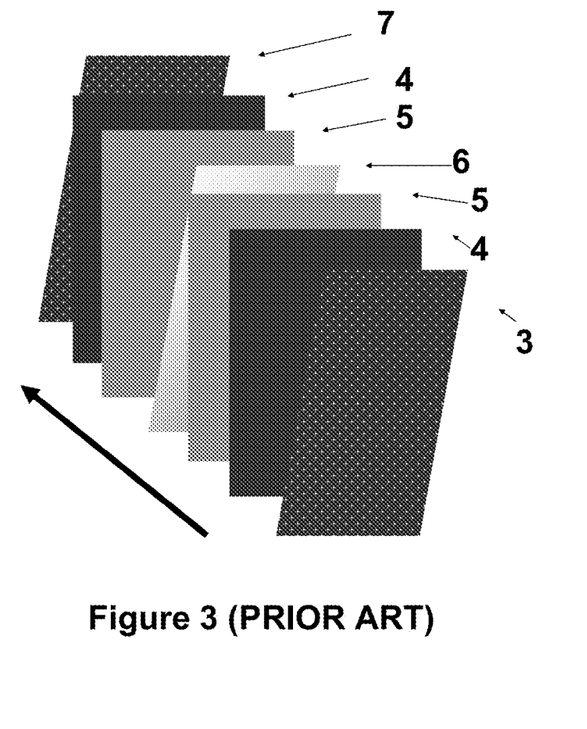
FIG. 3 shows an example of a multilayer structure of a flexible package of prior art.

To overcome this problem, flexible packages have been developed. It generally is a multilayer film containing one or a plurality of polymer films laminated by gluing to a thin central aluminum foil (FIGS. 2 and 3). The electric connections are ensured by means of current collection tabs which cross the flexible package. This type of package enables to increase the energy density relative to a same cell in a rigid package. Further, the internal layer of a flexible package, that is, the layer in contact with the electrochemical core, is insulating. It generally is a heat-sealable polymer (polyolefin), which is inert with respect to the electrochemical core, thus enabling to isolate the Li-ion cell from the ambient atmosphere and from the central aluminum foil.

A flexible package thus enables to comply with the requirements of energy density of the accumulator and of flexibility. It has however been observed that the chemical resistance of the sealing of a cell in a flexible package of prior art deteriorates along time.

Further, although the two types of available packages, flexible or rigid, each have advantages, the energy density of accumulators still has to be improved. Indeed, each of the essential components of accumulators generally has a single function, which generates an overweight. For example, in the case of a conventional cell in a flexible or rigid package, the current collectors ensure the conduction of electrons from the electrodes to the outside of the cell, while a second package is added to reinforce the resistance to shocks and to vibrations of the cell.

Thus, to improve the energy density of accumulators, Li-ion cell current collectors in the form of metal foams (aluminum, nickel . . . ) have been described in prior art. Such materials enable to increase the active surface area of the current collector while lightening the cell weight.

For shock resistance, the introduction of a polymer foam between the unit cells of an accumulator has been described in prior art. The foam can thus absorb the shock of a plurality of cells.

Although such solutions may seem satisfactory when considered individually from one another, the general weight of accumulators still needs to be limited.

The Applicant has developed a trifunctional component ensuring at the same time:
  the packaging of the Li-ion cell, that is, its isolation from the outer atmosphere;
  the role of an elastic current collector;
  the safety of the Li-ion cell in terms of resistance to shocks and to vibrations.

SUMMARY OF THE INVENTION

The Applicant has developed a new type of current collector also enabling to ensure the flexible package function. In an electrochemical cell comprising this current collector, it provides the following properties:
  conductive and elastic properties of the electrode supported by the current collector;
  tightness of the cell package;
  reversible compressibility of the electrode supported by the current collector.

Thus, not only the cell performance, but also the cell safety are thus improved. Indeed, prior art Li-ion cells generally comprise materials which may deform during the cycling, and also cause the forming of gas. The elasticity of the collector further enables to intrinsically improve the power performance and to keep the intimate contact of the electrode against the collector, particularly at high rates.

More particularly, the present invention relates to a current collector for an electrochemical lithium accumulator comprising an electronically insulating viscoelastic foam associated with an electroconductive polymer film.

Viscoelastic foam means a polymer material in the form of foam, having a reversible deformation. More particularly, it is a layer of a material having a resilience (or resilience rate) of at least 5%, advantageously between 5 and 100%.

The viscoelastic properties of said foam correspond to the response time of the material (foam) when a pressure is applied onto the material.

Further, advantageously, the foam has a density in the range from 0.5 to 2, preferably from 1.3 to 1.7.

The viscoelastic foam may be preferably selected from the group comprising viscoelastic foams which are deformable in the range where a Li-ion is used, that is, advantageously, between −60° C. and +100° C., more advantageously still between −20° C. and +40° C. It may particularly be a foam based on a material selected from the group comprising polyurethane, polyolefin(s), PVdF (polyvinylidene fluoride), and mixtures thereof. The viscoelastic foam may thus be a polyurethane, a polyolefin, or a PVdF, for example.

Generally, foams capable of being used in the context of the invention have an elasticity in the range from 5% to 100%, advantageously in the range from 35% to 50%.

The viscoelastic foam used advantageously has the above-described properties of resilience and/or density, and/or elasticity at the temperature of use of a lithium accumulator, that is, advantageously between −60° C. and +100° C., more advantageously still between −20° C. and +40° C.

As already mentioned, the current collector also comprises an electroconductive polymer film. The latter is laid on at least one of the two main surfaces of the viscoelastic foam. The current collector of the invention thus is a laminate comprising a foam, having at least a portion of one of its two main surfaces covered with an electroconductive polymer film.

When the current collector forming the object of the invention is used in a battery or accumulator, the polymer film is in contact with the electrode while the viscoelastic foam, which is electronically insulating, is exposed to the outer environment of the cell.

Advantageously, the conductive polymer film comprises electroconductive particles. These particles may be dispersed in a polymer or in a resin. According to the properties of the polymer or of the resin, the film may advantageously be elastic.

The elasticity of the electroconductive polymer film enables the latter to undergo deformations. Film elasticity more specifically means an ability to reversibly deform, in accordance with the viscoelastic foam. Thus, the polymer film may have the same resilience properties as the viscoelastic foam.

The conductive particles may be homogeneously dispersed throughout the entire polymer film. They may also be concentrated at the surface of the polymer film. The polymer film enables electrons to flow between electrodes.

Generally, the conductive particles may be selected from the group particularly comprising metal particles such as particles of electroconductive metal (Cu, Al), carbon particles (carbon black), carbon nanotubes.

Such conductive particles or fillers may amount to from 5 to 80% by weight of the polymer film. As already mentioned, the particles are advantageously dispersed in a polymer or in a resin.

The polymer and the resin may be electric conductors. In this case, the presence of conductive particles is optional. However, in this case, these materials generally have a low electric conductivity which generates a strong resistance. Accordingly, a preferred embodiment of the invention concerns a film comprising conductive particles dispersed in a polymer or a resin which are not electroconductive.

Thus, advantageously, the polymer film comprises a non-conductive thermoplastic matrix (at least a polymer or a resin).

It may particularly be a polymer (or thermoplastic resin) selected from the group comprising polyamides, polycarbonates, polyamide-imides, and polyether-imides.

Further, the film may comprise at least one, and advantageously one, thermosetting resin which may be selected from the group comprising saturated or unsaturated polyesters, vinylesters, epoxies, polyurethanes, polyureas, polyimides, bismaleimides. Such resins generally enable to obtain a more rigid current collector than in the case of thermoplastic matrixes.

The nature of the electroconductive film can thus enable to adjust the flexibility of the current collector forming the object of the invention.

According to a specific embodiment, the polymer film may also comprise organic and/or mineral fillers. The fillers enable to increase the rigidity of the current collector at the level of the surface in contact with the electrode, while maintaining the viscoelastic properties of the foam.

The mineral fillers may be selected from the group comprising carbonate chalks; silicas; talcs; wollastonite (mostly used with polyamides); clays; alumino-silicates; metal oxides and hydrates; glass (staple fibers, powder, hollow spheres, microspheres); carbon (carbon black, carbon nanotubes, carbon fibers), and mixtures thereof.

They may also be cellulosic fillers, particularly when the film comprises a thermosetting resin.

According to another specific embodiment, the electrode comprising the current collector may have very rigid properties. In this case, the polymer film may comprise:
 epoxy, polyurethane, polyimide, acrylic or styrene resins having a vitreous transition temperature Tg such that these resins are rigid at room temperature;
 a reinforcement formed of long fibers or of short fibers which may be selected from the group comprising glass, carbon, cellulose, silica (or quartz), aramid, boron, high-modulus polyethylene fibers, and natural fibers (corn, banana, cocoa . . . ). Such a reinforcement may appear in the form of a unidirectional, cloth, taffeta, serge, or satin type fabric.

However, according to a preferred embodiment, the polymer film is formed of conductive particles dispersed in a non-conductive polymer or resin.

Advantageously, and to ensure its electric isolation, the periphery of the polymer film of the current collector forming the object of the invention comprises a non-electroconductive area. In other words, the polymer film advantageously comprises an active area, that is, a conductive area and an inactive area, that is, an insulating area. The periphery forming a frame may thus have a width in the range from 1 mm to 1 cm.

When the polymer film comprises conductive fillers dispersed in an electroconductive or non-electroconductive polymer (or resin), it may be an area containing no conductive fillers, made of non-electroconductive polymer (or resin), advantageously thermosealable. In this case, it may be a non-active polyolefin area, for example.

Conversely, when the polymer film comprises conductive fillers dispersed in an non-electroconductive polymer (or resin), it may be a metal frame surrounding the polymer film. The frame is advantageously made of an electroconductive metal, preferably selected from the group comprising stainless steels, titanium, and aluminum. It may be made of aluminum having a weight capable of lightening the accumulator.

According to this specific embodiment, the frame is not in contact with the conductive particles.

Further, the metal frame advantageously has a thickness at least equal to 0.1 mm and smaller than 20 mm. It is thus possible to seal the package, advantageously by continuous or pulse laser welding.

Thus, the periphery of the conductive polymer film may be made of a thermosealable or metallic polymer.

The present invention also relates to a method of preparing the above-described current collector, by depositing an electroconductive polymer film on a viscoelastic foam, advantageously by printing. The foam/film association may also be formed by lamination.

The polymer film and the foam may be associated by deposition of the film on the foam, either by a printing technique (after having melted the polymer to liquefy it), or by lamination, preferably at high temperature, of the foam and polymer film layers. The lamination pressure is adjusted to adjust the thickness of the conductive polymer layer.

The current collector according to the invention has a thickness advantageously in the range from 10 to 500 micrometers.

The current collector forming the object of the invention may be used to form an electrode. An electrode material is deposited on the surface of the current collector comprising the electroconductive polymer film, according to techniques known by those skilled in the art.

According to another embodiment of the invention, the collector may be used to prepare a doubled-faced electrode comprising two positive or negative electrodes. According to this configuration, the collector successively comprises an electroconductive film, a foam, and an electroconductive film. Thus, each main surface of the collector comprising an electroconductive film may be covered with an electrode. On each of its surfaces, the current collector according to the invention is thus provided with an electrode material, possibly associated with a carbon electric conductor, of carbon black type. The electrode material may be identical or different.

The present invention also relates to an electrode and a lithium accumulator comprising at least one current collector such as described hereabove.

As already indicated, in the case of a double-faced electrode, the electrode material of each of the main surfaces of the collector may be identical or different. The double-faced electrode may thus comprise either two positive or negative electrode materials, or a positive electrode material and a negative electrode material. In other words, each of the two main surfaces of said collector comprises a positive electrode material or a negative electrode material. The double-faced electrode may thus be bipolar.

The field of the present invention concerning electrochemical lithium batteries or accumulators, it will be within the abilities of those skilled in the art to select the appropriate electrode materials.

The invention and the resulting advantages will better appear from the following non-limiting drawings and examples, provided as an illustration of the invention.

BRIEF DESCRIPTION OF THE DRAWINGS

FIGS. 7a and 7b show a conventional double-faced electrode according to the invention, seen in front view (FIG. 7a) and in side view (FIG. 7b).

DETAILED DESCRIPTION OF THE INVENTION

Prior art Li-ion cells having a flexible package (FIG. 2) are generally formed of a cell core (1) coated with a flexible multilayer package (2). The multilayer (2) is typically formed of the association, from the inside to the outside of the cell (FIG. 3), of the following layers:
 a polyolefin layer (3) having an approximate 50-micrometer thickness;
 a glue layer (4);
 a so-called foundation layer (5);
 an aluminum foil (6) having an approximate 40-micrometer thickness;
 a so-called foundation layer (5);
 a glue layer (4);
 a polyolefin layer (7) having an approximate 20-micrometer thickness.

Further, in this type of cells, the connection between the electrodes and the positive and negative poles is generally consolidated by a polymer reinforcement (8) (FIG. 2).

Figures 4A, 4B:
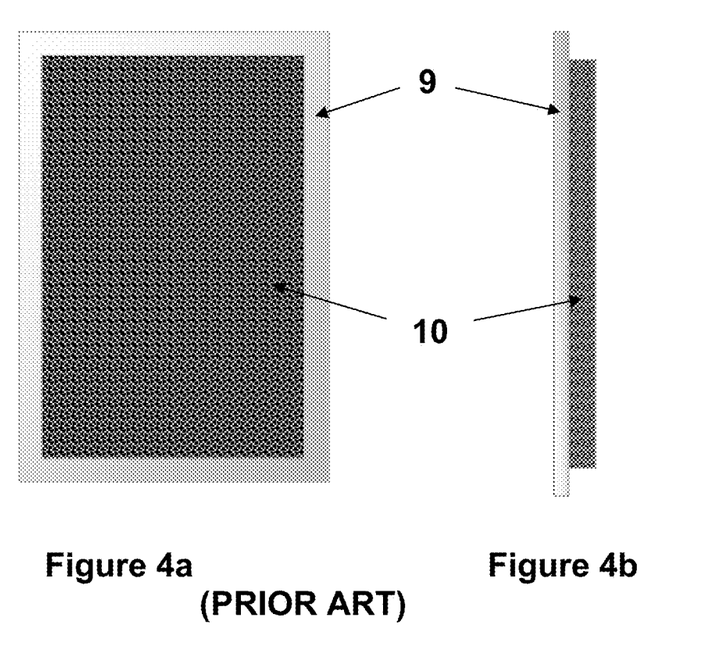
FIGS. 4a and 4b show a conventional terminal electrode for a Li-ion cell, seen from above (FIG. 4a) and in side view (FIG. 4b).

Prior art Li-ion cells are generally formed of a metallic (aluminum) current collector (9) having the electrode material (10) deposited thereon (FIG. 4).

Electrode material particularly designates materials based on $LiFePO_4$, $Li_4Ti_5O_{12}$, NMC (lithium nickel manganese cobalt oxide), Graphite, Silicon, Tin, etc. . . . . Preferably, the material is silicon.

Prior art cells thus comprise an electrochemical core of current collector/anode/separator/current collector type in a multilayer package.

Figure 5:
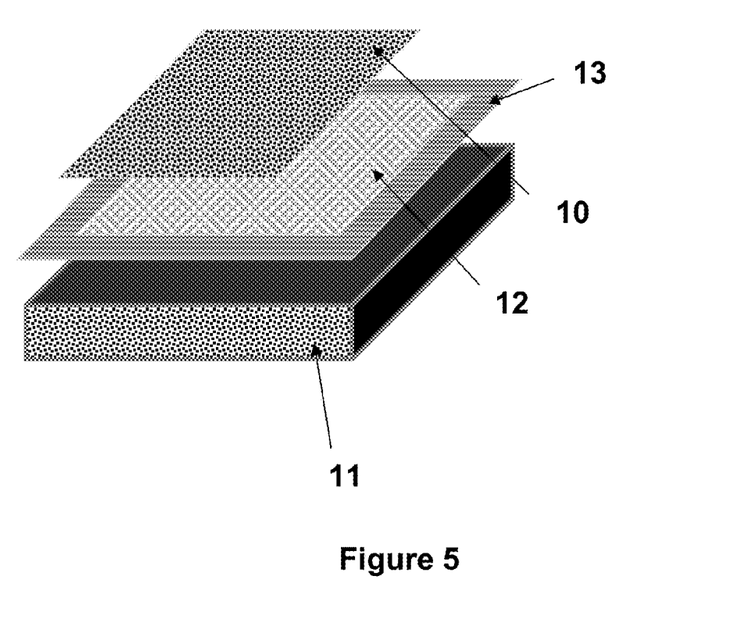
FIG. 5 shows a perspective view of a first embodiment of the current collector forming the object of the invention.

FIG. 5 shows a specific embodiment of the current collector according to the invention. It comprises a viscoelastic foam (11) supporting an elastic conductive film (12) comprising conductive particles. The film may be a mixture of conductive metal and of conductive or non-conductive resin. The film (12) may be deposited on the foam (11) by printing.

This collector is associated with an electrode (10) based on an active electrode material and possibly on carbon black. The active material and the carbon black may be supported by a polymer.

In this collector, it should be noted that the polymer film (12) comprises at its periphery a thermosealing and non-conductive resin or polymer (13). The periphery, that is, the external edges of the collector are thus non-conductive. The properties of the material (13) surrounding the film (12) may allow a hot sealing of the cell. It may be a polyolefin, for example.

Figure 6:
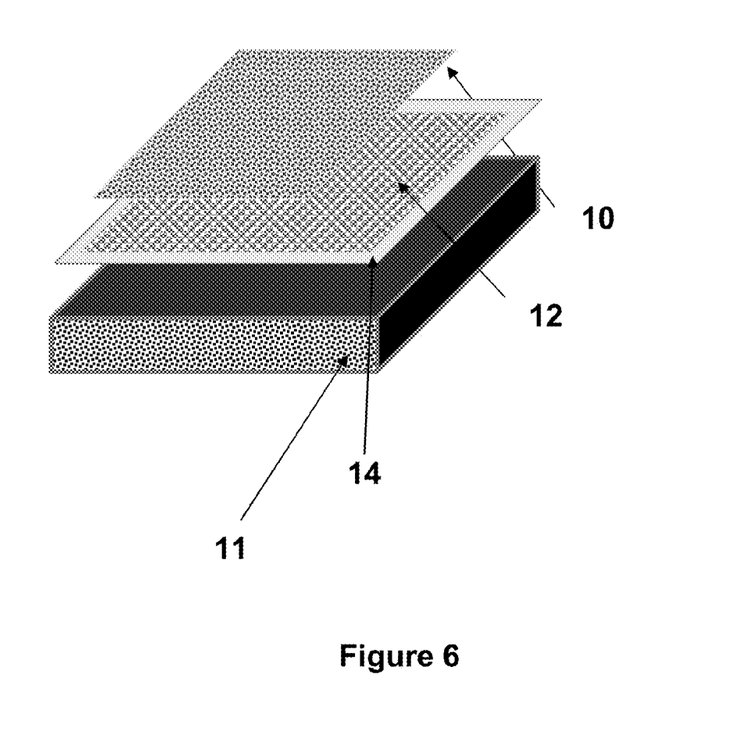
FIG. 6 shows a perspective view of a second embodiment of the current collector forming the object of the invention.

FIG. 6 illustrates a second specific embodiment of the invention according to which the film (12) is a mixture of conductive metal and of non-conductive resin. The film is surrounded with a metal frame (14).

In this embodiment, the metal frame (14) is in contact with the non-conductive resin of the film (12). The electric conductivity properties of the film (12) are only ensured by the presence of conductive metal particles. The film (12), although it is in contact with the metal frame (14) surrounding it, is not in electric contact with said metal frame due to the non-conductive character of the resin. The particles may be concentrated to be distant from the film periphery.

The metal frame (14) enables to weld the battery with a laser, thus ensuring the tightness of the device. Rather than a metal foil, it is a frame having its inner dimensions equal to or greater than the main surface of the film (12).

Figures 7, 7B:
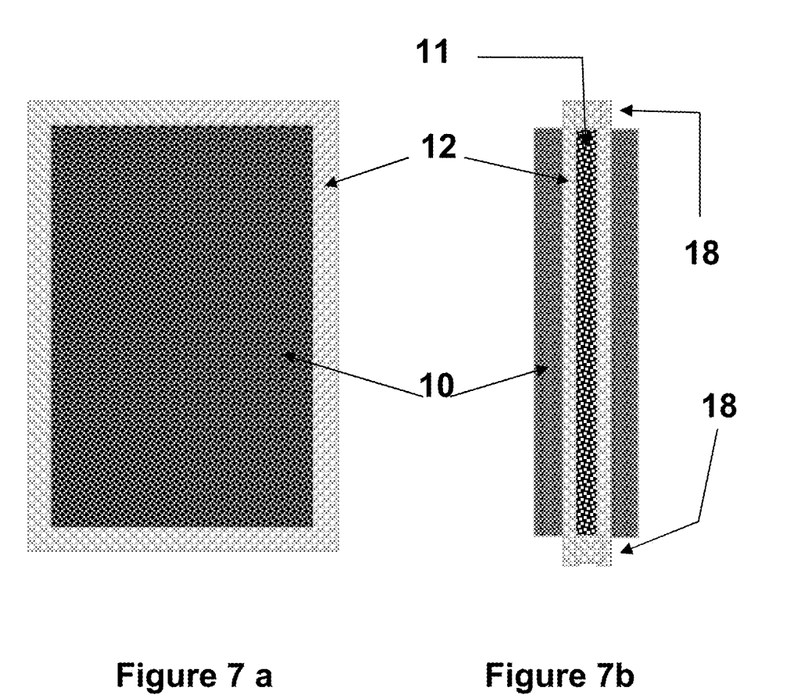

According to another specific embodiment, the current collector forming the object of the invention may be used to form a double-faced electrode (FIG. 7).

In this case, the two main surfaces of the viscoelastic foam (11) are covered with the film (12) (FIG. 7b), the electrode material (10) being deposited on either side of the collector. Further, according to the nature of the polymer film (12), its periphery may be made of non-conductive thermosealing resin or polymer (13) or of metal (14).

According to a variation, the electrode material may be different on either side of the collector to form a bipolar electrode.

In such a double-faced electrode, the upper edges (18) of the polymer film (12) may be metallized to enable the electrical welding of a plurality of current collectors to one another.

Figure 8A:
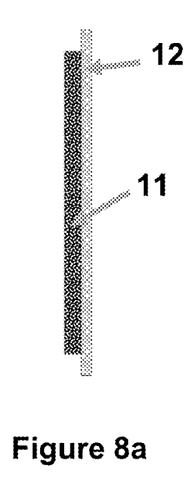
FIGS. 8a-8e show the steps of the method of manufacturing a cell according to an embodiment of the invention.

FIGS. 8a) to 8e) illustrates the manufacturing steps of a Li-ion comprising the current collector according to the invention.

The first step concerns the forming of the current collector by association of the viscoelastic foam (11) and of the polymer film (12), which may particularly be thermoplastic (FIG. 8a).

The viscoelastic foam first has to be cut (11) to the desired dimensions, according to the accumulator dimensions.

Then, a polymer film (12), preferably thermoplastic, is deposited on the foam, either by a printing technique (after having melted the polymer to liquefy it), or by hot lamination of the foam and polymer film layers. The lamination pressure is adjusted to adjust the thickness of the conductive polymer layer.

It should further be noted that the deposition of the polymer on the rough foam may generate a rough surface. The current collector may however be used as is or a second run will enable to smooth the collector surface state to fill the "holes".

The second step (FIG. 8b) comprises depositing the active electrode material (10) on the polymer film (12), particularly by printing an electrode ink by silk-screening.

Figure 8B:
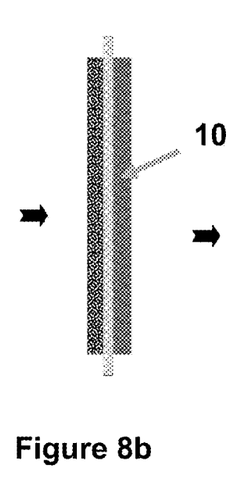

The electrode ink (10) is generally made of the active material, possibly carbon black, and of polymer.

According to cases, the current collector, and more particularly the film (12), may have a smooth or rough surface. When the film surface (12) is smooth, the electrode capacity, or weight of electrochemically active material per surface area unit, can be determined by measuring the thickness of the coated ink. However, when the surface of the film (12) is rough, the electrode capacity may be determined by weighting the electrode.

This method may be implemented to prepare positive (10) and negative (15) electrodes but also double-faced electrodes. Further, the use of gelled electrodes is advantageous to avoid optimizing the hot calendering of an electrode on foam.

The third step (FIG. 8c) concerns the forming of the electrochemical cell core.

Figure 8C:
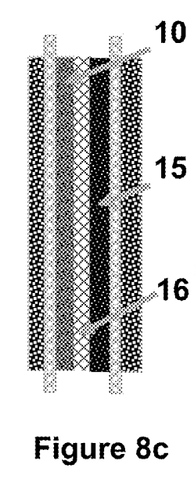

The electrochemical core successively comprises a positive electrode (10) opposite a negative electrode (15), the latter being separated by an electrically-insulating microporous film (16) (more generally made of polyolefin). A gelled polymer film (16) may in particular be deposited by printing (silk screening, for example).

The fourth step (FIG. 8d) of the method concerns the sealing of the cell by thermosealing by means, in particular, of a thermoplastic polymer (17).

Figure 8D:
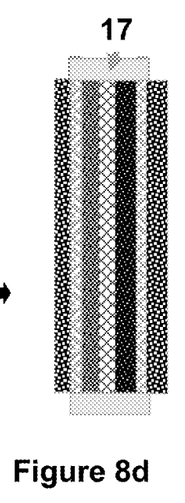
Figure 8E:
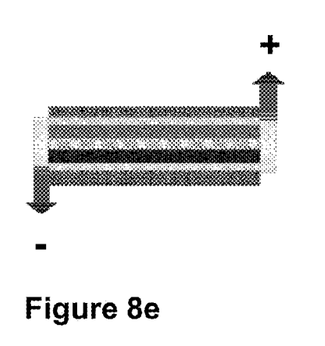

In this case, the cell is closed by thermosealing of the thermoplastic polymer of the film (12) internal to the Li-ion film, according to a frame external to the active portion. The polymer (17) added between the two conductive polymer sheets is not conductive (to avoid shorting the cell). To improve the cell tightness, it may preferably be a polyolefin.

The fifth step (FIG. 8e) concerns the creating of the electric connections between the electrodes and the outside of the cell. They are formed from an exposed area at the level of the external portion of the foam. The exposed area may preferably be metallized to be welded to a conductive element such as a pad or a wire.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A current collector for an electrochemical lithium accumulator constituted of an electronically-insulating viscoelastic foam and an electroconductive polymer film.

2. The current collector of claim 1, wherein the electroconductive polymer film comprises electrically-conductive particles.

3. The current collector of claim 1, wherein the polymer film comprises conductive particles dispersed in a polymer or in a resin.

4. The current collector of claim 2, wherein the particles are selected from the group consisting of carbon black, metal particles, and carbon nanotubes.

5. The current collector of claim 1, wherein the polymer film comprises a polymer selected from the group consisting of polyamides, polycarbonates, polyamide-imides, and polyether-imides.

6. The current collector of claim 1, wherein the electroconductive polymer film comprises a thermosetting resin selected from the group consisting of saturated or unsaturated polyesters, vinylesters, epoxies, polyurethanes, polyureas, polyimides, and bismaleimides.

7. The current collector of claim 1, wherein the viscoelastic foam is based on a material selected from the group consisting of polyurethanes, polyolefins, polyvinylidene fluoride, and mixtures thereof.

8. The current collector of claim 1, wherein the polymer film comprises at its periphery a non-electroconductive area.

9. The current collector of claim 1, wherein the viscoelastic foam has a resilience rate in the range from 5 to 100% at a temperature in the range from −60° C. to +100° C.

10. The current collector of claim 1, wherein the viscoelastic foam has a relative density in the range from 0.5 to 2 at a temperature in the range from −60° C. to +100° C.

11. A method of preparing the current collector of claim 1, wherein an electrically-conductive polymer film is deposited on a viscoelastic foam.

12. The current collector preparation method of claim 11, wherein the polymer film and the foam are associated by printing or lamination.

13. An electrode comprising the current collector of claim 1.

14. A double-faced electrode comprising the current collector of claim 1.

15. A lithium accumulator comprising at least one current collector of claim 1.

* * * * *